(12) United States Patent
Schmidt et al.

(10) Patent No.: US 8,774,470 B1
(45) Date of Patent: Jul. 8, 2014

(54) PROCESSING A SATELLITE IMAGE OF A REGION TO DETERMINE A TERRAIN BOUNDARY INCLUDED THEREIN

(75) Inventors: Karl Johann Schmidt, Zurich (CH); Matthias Heiler, Zurich (CH); Roland Kehl, Dubendorf (CH)

(73) Assignee: Google Inc., Mountain View, CA (US)

( * ) Notice: Subject to any disclaimer, the term of this patent is extended or adjusted under 35 U.S.C. 154(b) by 158 days.

(21) Appl. No.: 13/438,788

(22) Filed: Apr. 3, 2012

(51) Int. Cl.
*G06K 9/00* (2006.01)

(52) U.S. Cl.
USPC ............................................. 382/113

(58) Field of Classification Search
None
See application file for complete search history.

(56) References Cited

U.S. PATENT DOCUMENTS

| | | | |
|---|---|---|---|
| 2005/0100220 A1* | 5/2005 | Keaton et al. | 382/191 |
| 2007/0291994 A1* | 12/2007 | Kelle et al. | 382/110 |
| 2009/0161944 A1* | 6/2009 | Lau et al. | 382/154 |
| 2010/0034483 A1* | 2/2010 | Giuffrida et al. | 382/284 |
| 2010/0040260 A1* | 2/2010 | Kelle et al. | 382/110 |
| 2011/0110562 A1* | 5/2011 | Kelle et al. | 382/110 |
| 2012/0257818 A1* | 10/2012 | Bertozzi et al. | 382/155 |

* cited by examiner

*Primary Examiner* — Atiba O Fitzpatrick
(74) *Attorney, Agent, or Firm* — McDermott Will & Emery LLP (57) ABSTRACT

A system and method for processing a satellite image to determine a terrain boundary. Pixel data corresponding to a satellite image is obtained. For each pixel within a subset of the pixel data, multiple image features are determined corresponding to texture and color statistics for the pixel and neighboring pixels, based on a feature selection process for selecting discriminative features. An initial set of rules is generated for determining a terrain boundary. Plural image models for applying to the pixel data are created based on the initial set of rules. The plural image models are applied to the pixel data to generate at least one probability map, which represents output of the plural image models and corresponds to different terrains within the satellite image. A binary label mask is generated for the satellite image based on the probability map, and mask indicates segmentations corresponding to the different terrains.

22 Claims, 6 Drawing Sheets

PROCESSING A SATELLITE IMAGE OF A REGION TO DETERMINE A TERRAIN BOUNDARY INCLUDED THEREIN

BACKGROUND

The present disclosure generally relates to image processing, and, in particular, to processing a satellite image of a region to determine a terrain boundary included therein.

Satellite imagery consists of photographs of the earth, and can be acquired at a variety of different resolutions from a variety of different sensors. Conventional systems provide for processing the satellite imagery to distinguish between different types of terrains (e.g., bodies of water, land, mountains, forests). Such processing can be useful, for example, in web mapping service applications.

Due to the above-described variance in resolution and sensor capture for the satellite imagery, it may be difficult to automatically refine maps based on captured satellite image data. For example, some image data may have low resolution, and the processing of such data to determine terrain boundaries may yield inaccurate results (e.g., due to noise in the image). Thus, it may be desirable to refine the terrain boundaries of maps corresponding to multiple satellite images.

SUMMARY

The disclosed subject matter relates to a machine-implemented method of processing a satellite image of a region to determine a terrain boundary included therein. The method comprises obtaining pixel data corresponding to the satellite image of the region, and determining, for each pixel within a subset of the pixel data, multiple image features corresponding to texture and color statistics for the pixel and neighboring pixels of the pixel, based on a feature selection process for selecting discriminative features from the pixel data. The method further comprises generating an initial set of rules for determining a terrain boundary based on the obtained multiple image features, and creating plural image models for applying to the pixel data based on the initial set of rules. In addition, the method comprises applying the plural image models to the pixel data to generate at least one probability map, wherein the at least one probability map represents output of the plural image models and corresponds to different terrains within the satellite image, and generating a binary label mask for the satellite image based on the generated probability map, wherein the binary label mask indicates segmentations corresponding to the different terrains.

The disclosed subject matter further relates to a system for processing a satellite image of a region to determine a terrain boundary included therein. The system comprises one or more processors, and a machine-readable medium comprising instructions stored therein, which when executed by the processors, cause the processors to perform operations comprising obtaining pixel data corresponding to the satellite image of the region. The operations further comprise determining, for each pixel within a subset of the pixel data, multiple image features corresponding to texture and color statistics for the pixel and neighboring pixels of the pixel, based on a feature selection process for selecting discriminative features from the pixel data, wherein the determining comprises creating at least one histogram for each pixel within the subset of the pixel data, and generating an initial set of rules for determining a terrain boundary based on the obtained multiple image features. In addition, the operations comprise creating plural image models for applying to the pixel data based on the initial set of rules, applying the plural image models to the pixel data to generate at least one probability map, wherein the at least one probability map represents output of the plural image models and corresponds to different terrains within the satellite image, and generating a binary label mask for the satellite image based on the generated probability map, wherein the binary label mask indicates segmentations corresponding to the different terrains.

The disclosed subject matter also relates to a machine-readable medium comprising instructions stored therein, which when executed by a system, cause the system to perform operations comprising obtaining pixel data corresponding to a satellite image of a region, and determining, for each pixel within a subset of the pixel data, multiple image features corresponding to texture and color statistics for the pixel and neighboring pixels of the pixel, based on a feature selection process for selecting discriminative features from the pixel data. The operations further comprise generating an initial set of rules for determining a terrain. boundary based on the obtained multiple image features, and creating plural image models for applying to the pixel data based on the initial set of rules. In addition, the operations comprise applying the plural image models to the pixel data to generate at least one probability map, wherein the at least one probability map represents output of the plural image models and corresponds to different terrains within the satellite image, performing a smoothing process on the probability map to enforce consistency between neighboring pixels and overlapping images, wherein the overlapping images are used to remove obstacles corresponding to at least one of cloud coverage or snow coverage, and generating a binary label mask for the satellite image based on the generated probability map, wherein the binary label mask indicates segmentations corresponding to the different terrains.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter describes systems and techniques for processing a satellite image of a region to determine a terrain boundary included therein. Pixel data. corresponding to a satellite image of a region is obtained. For each pixel within a subset of the pixel data, multiple image features are determined corresponding to texture and color statistics for the pixel and neighboring pixels of the pixel, based on a feature selection process for selecting discriminative features from the pixel data. An initial set of rules is generated for determining a terrain boundary based on the obtained multiple image features. Plural image models for applying to the pixel data are created based on the initial set of rules. The plural image models are applied to the pixel data to generate at least one probability map. The at least one probability map represents output of the plural image models and corresponds to different terrains within the satellite image. A binary label mask is generated for the satellite image based on the generated probability map, wherein the binary label mask indicates segmentations corresponding to the different terrains.

Thus, it is possible to detect terrain boundaries (e.g., water bodies) from low resolution satellite imagery, Machine learning models can be trained automatically or semi-automatically, and a hierarchical terrain boundary refinement strategy can be applied to satellite imagery to generate polygons corresponding to terrain boundaries.

Figure 1:
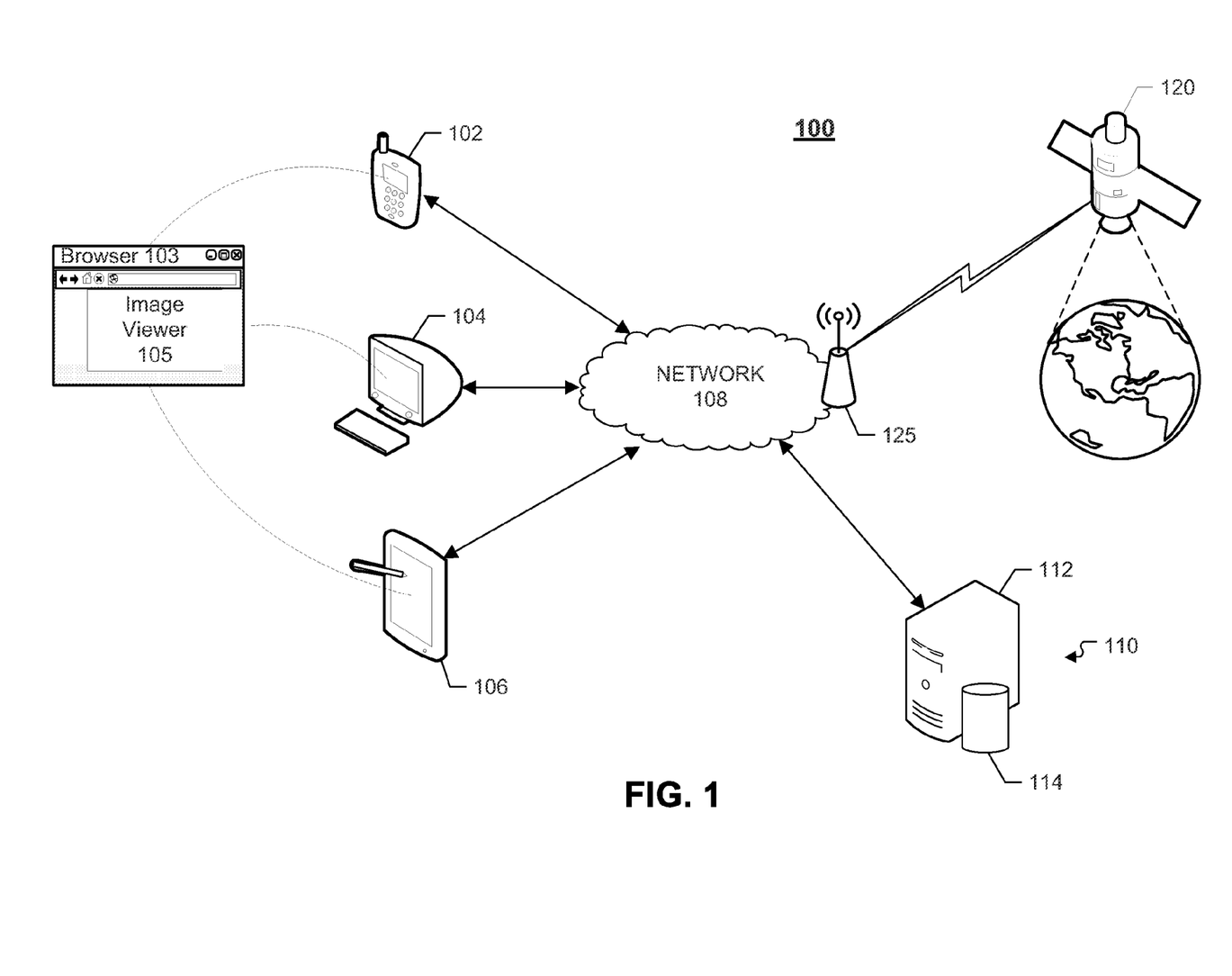
FIG. 1 illustrates an example distributed network environment which can provide for processing a satellite image of a region to determine a terrain boundary included therein.

FIG. 1 illustrates an example distributed network environment which can provide for processing a satellite image of a region to determine a terrain boundary included therein. Although network environment 100 is described with reference to satellite images, it should be noted that embodiments are not intended to be limited thereto, and that the techniques for processing a satellite image as described herein may be applied to other types of images.

As shown in the example of FIG. 1, network environment 100 includes computing devices 102, 104 and 106, a computing system 110, a satellite 120, and a satellite base station 125. Computing devices 102 to 106 and computing system 110 can communicate with each other through a network 108. Computing system 110 can include one or more computing devices 112 (e.g., one or more servers) and one or more computer-readable data storage devices 114 (e.g., one or more databases).

Each of computing devices 102, 104 and 106 may represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EG-PRS) mobile phone, a media player, a navigation device, an email device, a game console, or a combination of any these data processing devices or other data processing devices.

Computing devices 102 to 106 and 112 may be provided access to and/or receive application software executed and/or stored on any of the other computing systems 102 to 106 and 112. Computing device 112 can represent various forms of servers including, but not limited to a web server, an application server, a proxy server, a network server, or a server farm.

In some aspects, the computing devices may communicate wirelessly through a communication interface (not shown, which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, system 100 can be a distributed client/server system that spans one or more networks such as network 108. Network 108 can be a large computer network, such as a local area network (LAN), wide area network (WAN), the Internet, a cellular network, or a combination thereof connecting any number of mobile clients, fixed clients, and servers. In some aspects, each client (e.g., computing devices 102, 104, and 106) can communicate with servers (e.g., computing device 112) via a virtual private network (VPN), Secure Shell (SSH) tunnel, or other secure network connection. In some aspects, network 108 may further include a corporate network (e.g., intranet) and one or more wireless access points.

In an example, each of computing devices 102, 104, and 106 executes a browser 103 including an image viewer 105. Browser 103 and image viewer 105 may be implemented using any type of computing device. Such computing device can include, but is not limited to, a personal computer, mobile device such as a mobile phone or tablet computer, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. Further, it should be noted that image viewer 105 may be implemented as a standalone application, or it may be executed within browser 103. For example, image viewer 105 may be executed as a script, plug-in or program extension within browser 103.

In an example, image viewer 105 executing at any of devices 102, 104, or 106 requests configuration information from one or more servers 112 of computing system 110. For example, such configuration information may include metadata corresponding to an image or other digital content to be loaded for image viewer 105. In an embodiment, the configuration information is presented in a form such as the Extensible Markup Language (XML). Image viewer 105 retrieves image data for the image, for example, in the form of images or in the form of image tiles. For example, such image data may include the configuration information in a relevant file format.

The configuration information and image data can be used by the image viewer at computing devices 102, 104, and 106 to generate a visual representation of the image and any additional user interface elements. In addition, such a visual representation and additional user interface elements may be presented to a user on a display of the respective computing device. Such a display can be any type of electronic display for viewing images or can be any type of rendering device adapted to view images (e.g., three-dimensional images). As a user interacts with an input device to manipulate the visual representation of the image, image viewer updates the visual representation and proceeds to download additional configuration information and images as needed.

In an embodiment, image viewer 105 is integrated with a mapping service provided by computing system 110 and made accessible to a user of computing device 102, 104, or 106 via an interface of browser 103. For example, such a mapping service may be accessible via a graphical user interface (GUI) provided in browser 103. Further, such a Gill may include functions enabling the user to manipulate a position and orientation of a virtual camera in order to view portions of a geographic area corresponding to a digital map from different perspectives. In an example, the GUI may be presented as a map viewer integrating image viewer 105 within browser 103. In an embodiment, such a mapping service displays a visual representation of a map, e.g., as a viewport for displaying a grid of map tiles.

The mapping service may be implemented using any combination of markup language and scripting elements, e.g., using HTML and Javascript, As the viewport is moved (e.g., based on user input at computing device 102, 104, or 106), the mapping service may request additional map tiles from server(s) 112 as may be necessary, for example, when the requested map tiles have not already been cached in a local memory of the user device. Notably, the server(s) which serve the map tiles can be the same or different server(s) from the server(s) which serve image data or the other data involved herein.

In an embodiment, the visual representation of the map includes a representation of an aerial satellite image depicting a real-world scene comprising various objects (e.g., bodies of water, mountains, landmarks, buildings or other structures, etc.) corresponding to a scene of a geographic area as captured by a satellite 120. For example, the images captured by satellite 120 may be representations of contiguous portions or strips of a geographic region, which are segmented by satellite 120 into different sections of a particular size and shape (e.g., equally-sized rectangular sections). Image data captured by satellite 120 may be relayed, for example, to an Earth base station 125 using a data link for communication between satellite 120 and base station 125. For example, images captured by satellite 120 initially may be in the form of raw image data and stored as raster data files. As such, the raw image data received at base station 125 may be processed and formatted into an appropriate image file to be stored in a data repository along with any relevant metadata.

Accordingly, images displayed using image viewer 105 may include aerial satellite images of different geographic regions on the map based on additional processing of such image files for purposes of the map service. For example, digital satellite images captured by satellite 120 may be processed (e.g., by server(s) 112) and stored at computing system 110 (e.g., database(s) 114) for later retrieval and transmission to any of computing device 102, 104 or 106 over network 108. In an example, image viewer 105 interfaces with computing system 110 in order to coordinate the operation of user interface elements for the mapping service. For example, image viewer 105 and the mapping service may operate together so as to allow the user to interact with either image viewer 105 or the mapping service in order to change the user's virtual location or views displayed on the map as provided by the mapping service. Further, any detected user interaction may cause a change in location or orientation to be reflected in the visual representation of the map or satellite imagery corresponding to a particular geographic location as displayed in image viewer 105 or in another content area provided by the mapping service or both.

As will be described in further detail below, the additional processing of the images at computing system 110 can include determining terrain boundaries based on digital satellite images captured by satellite 120.

Figure 2:
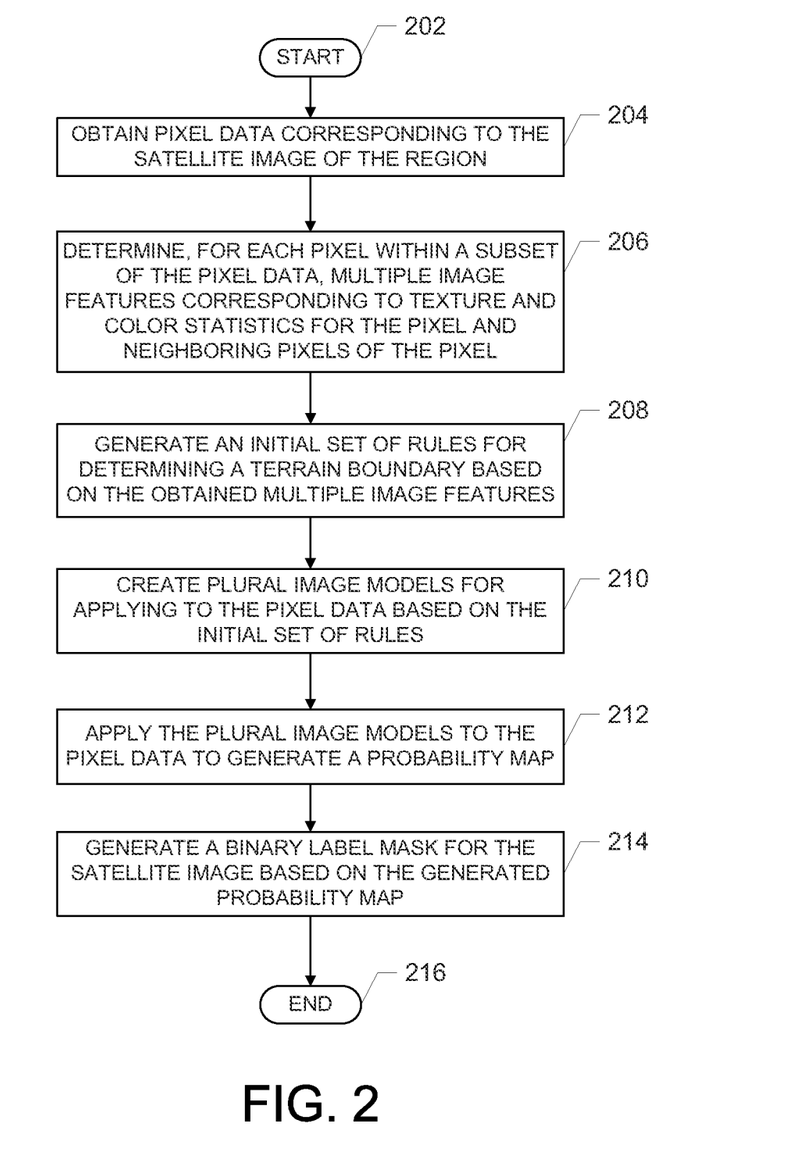
FIG. 2 illustrates an example process by which a satellite image of a region is processed to determine a terrain boundary.

FIG. 2 illustrates an example process by which a satellite image of a region is processed to determine a terrain boundary. For example, the terrain boundary can correspond to a boundary for a body of water. In addition, the satellite image can correspond to a single satellite image or a blend of multiple satellite images. Following start block 202, pixel data corresponding to satellite image of a region is obtained at step 204.

At step 206, for each pixel within a subset of the pixel data, multiple image features are determined corresponding to texture and color statistics for the pixel and neighboring pixels of the pixel. The multiple image features are determined based on a feature selection process for selecting discriminative features from the pixel data. The multiple features can be determined by creating at least one histogram for each pixel within the subset of the pixel data. The at least one histogram can correspond to at least one of a color histogram, a texton histogram based on a Gabor filter response, or a texton histogram based on small image patches. The feature selection process can correspond to at least one of a linear discriminant analysis (LDA) with diagonal and with full covariance matrices or a boosting algorithm.

At step 208, an initial set of rules is generated for determining a terrain boundary based on the obtained multiple image features. At step 210, plural image models are created for applying to the pixel data based on the initial set of rules. The plural image models can correspond to at least one of a model based on k-means clustering, a boosted decision stumps model, or a boosted linear classifier model. The model based on k-means clustering can include a Gaussian mixture model with unit or with full covariance matrices.

At step 212, the plural image models are applied to the pixel data to generate at least one probability map. The at least one probability map represents output of the plural image models and corresponds to different terrains within the satellite image. The at least one probability map can correspond to separate probability maps output for each of the plural image models. Alternatively, the at least one probability map can correspond to the collective output of the plural image models. A smoothing process can be performed on the probability map to enforce consistency between neighboring pixels and overlapping images. The overlapping images can be used to remove obstacles corresponding to at least one of cloud coverage or snow coverage.

At step 214, a binary label mask is generated for the satellite image based on the generated probability map. The binary label mask indicates segmentations corresponding to the different terrains. The process then ends at end block 216.

Steps 204 to 212 can be repeatedly performed using image data of higher resolution for the satellite image. One or more satellite images can be divided into small tiles, and steps 204 to 212 can be performed. in parallel on the small tiles on a cluster of computers.

Figure 3:
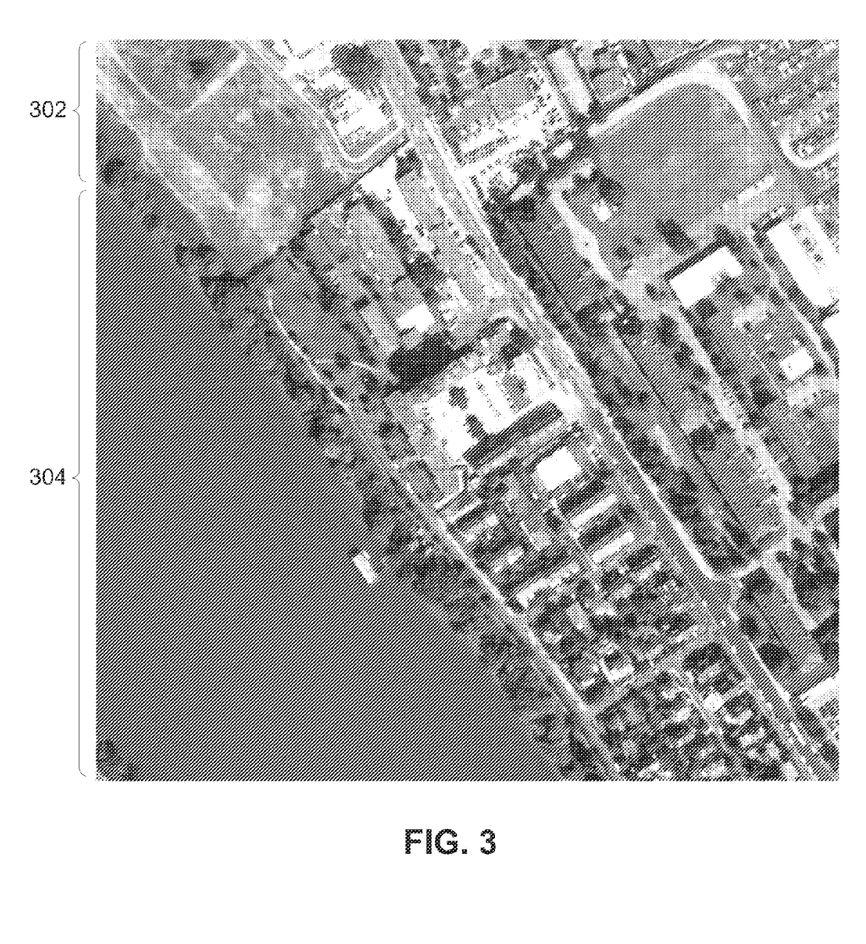
FIG. 3 illustrates an example of a sample input image from which terrain boundaries can be determined.

FIG. 3 illustrates an example of a sample input image from which terrain boundaries can be determined. In the example of FIG. 3, a satellite (or aerial) image includes terrains including a body of water 304 and a land area 302. The subject technology can provide for determining terrain boundaries, such as the boundary between the body of water 304 and the land area 304.

Figure 4:
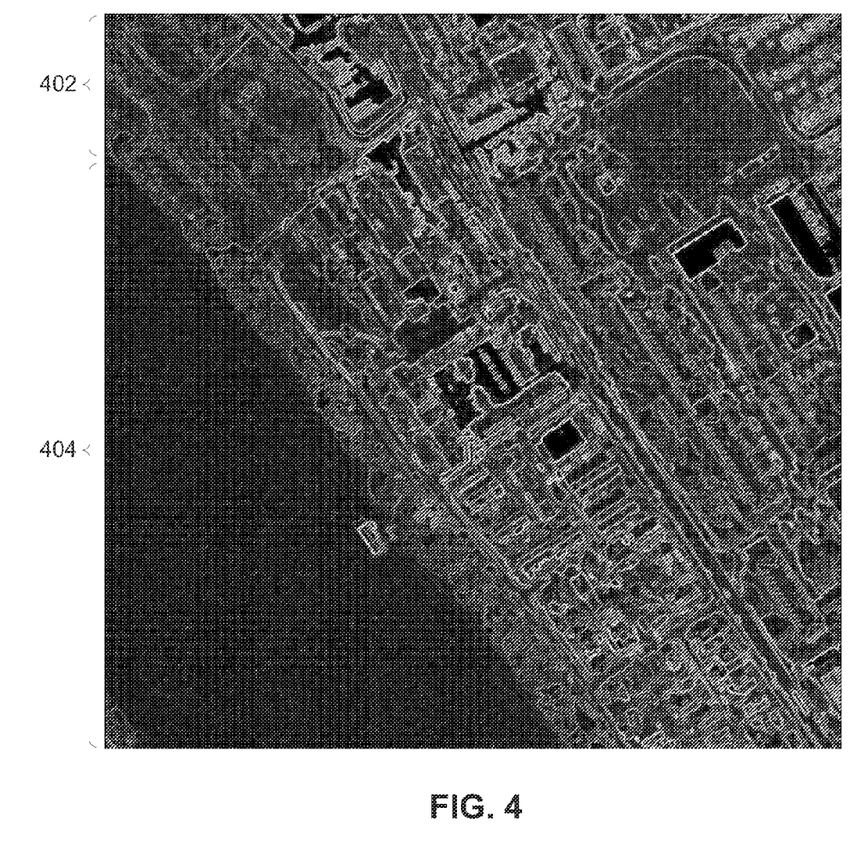
FIG. 4 illustrates an example of an image feature map generated from the sample input image of FIG. 3.
Figure 5A:
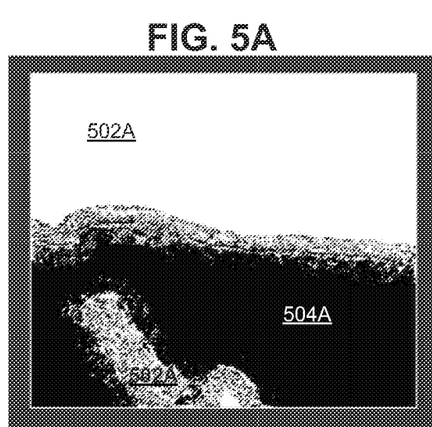
FIGS. 5A to 5F illustrate examples of the output of different statistical models for determining terrain boundaries.
Figure 5B:
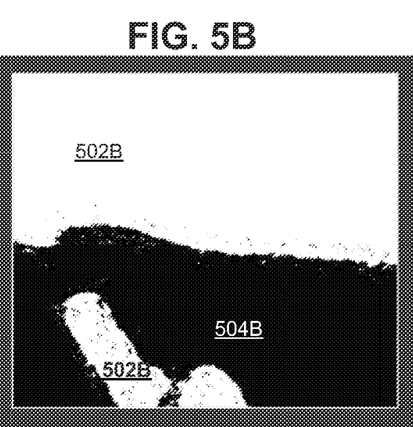
Figure 5C:
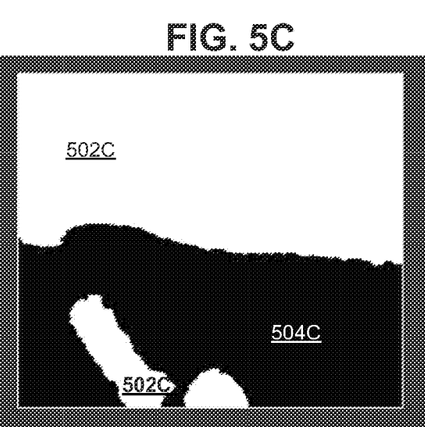
Figure 5D:
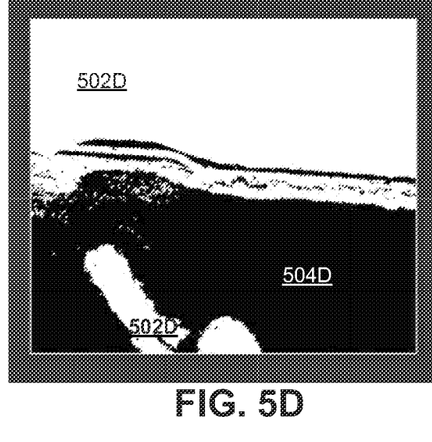
Figure 5E:
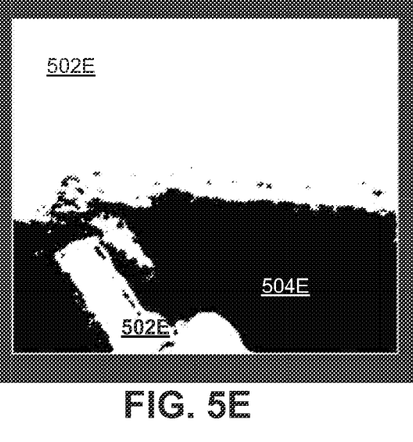
Figure 5F:
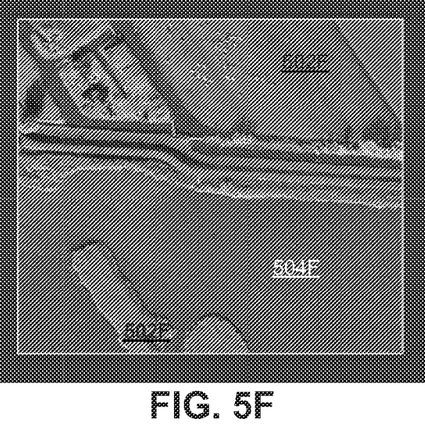

FIG. 4 illustrates an example of an image feature map generated from an input image. For example, the input image can correspond to a high-resolution RGB image (e.g., the sample input image of FIG. 3). In the example of FIG. 4, multiple image features are determined corresponding to texture and color statistics for each pixel and neighboring pixels of the pixel of the input image. For example, neighboring pixels can correspond to approximately 20 pixels surrounding a given pixel. The multiple image features can be determined based on a feature selection process for selecting discriminative features from the pixel data. For example, a rough initialization (e.g., from Landsat data) can be used to guide the feature selection process where the most discriminative image features are selected.

In determining the multiple image features, at least one histogram can be created for the pixel data (e.g., for a pixel and its neighboring pixels). The at least one histogram can correspond to a color histogram, a texton histogram based on a Gabor filter response, or a texton histogram based on small image patches. In addition, the feature selection process can correspond to a linear discriminant analysis (LDA) with diagonal and with full covariance matrices, or to a boosting algorithm.

FIGS. 5A to 5F illustrate examples of the output of different statistical models for determining terrain boundaries. Each of FIGS. 5A to 5F respectively correspond to the output of a different statistical model. As can be seen in FIGS. 5A to 5F, different statistical models are used to output terrain boundaries to distinguish between bodies of water (e.g., elements 504A-F) and land areas (e.g., elements 502A-F).

As noted above, multiple image features are determined corresponding to texture and color statistics for each pixel and neighboring pixels of the pixel within a satellite image. These multiple features are used to build multiple image models. For example, the image models can correspond to a model based on k-means clustering, a boosted decision stumps model, or a boosted linear classifier model. The model based on k-means clustering can include a Gaussian mixture model with unit covariance matrices.

The image models can be applied to the pixel data to generate probability maps, such as those shown in FIGS. 5A to 5F. The probability maps can correspond to grayscale or color images showing the probabilities for different types of terrains within the satellite image. A smoothing process can be performed on the probability maps to enforce consistency between neighboring pixels and overlapping images, where the overlapping images can be used to remove obstacles corresponding to at least one of cloud coverage or snow coverage.

A binary label mask can be generated for the satellite image based on the generated probability map, where the binary label mask indicates segmentations corresponding to the different terrains. In some aspects, the probability map can be used to define a markov random field (MRF) which can be fed into a segmentation algorithm. The edge term of the MRF can be modulated such that segmentations along strong edges in an RGB image are preferred.

With reference to segmentation, in some circumstances, it may be challenging to perform image segmentation at very fine resolutions. For example, it is possible for an object boundary to be 200 m off a true boundary. Applied to a 110 cm resolution image, this offset would typically correspond to 2000 pixels. As such, the algorithm of the subject disclosure can be applied within a multi-scale framework. In particular, segmentation masks computed at coarser levels can used as initialization for finer levels. This can allow for addressing larger corrections in terrain boundaries.

In this regard, the multi-scale framework of the subject disclosure can provide for a coarse initialization computed from available data, and providing a segmentation result on a coarse level by using the coarse initialization. A segmentation result at a finer scale can be provided using the segmentation result computed at the coarser scale as the initialization. A result at even a finer scale can be provided to correct a rough outline towards the high resolution imagery. In contrast, a single-scale approach would typically not be able to produce a meaningful segmentation at such a fine resolution from the original coarse initialization.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand atone program or as a module, component, subroutine, object, or other unit suitable for use in a computing environment. A computer program may, hut need not, correspond to a file in a file system, A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
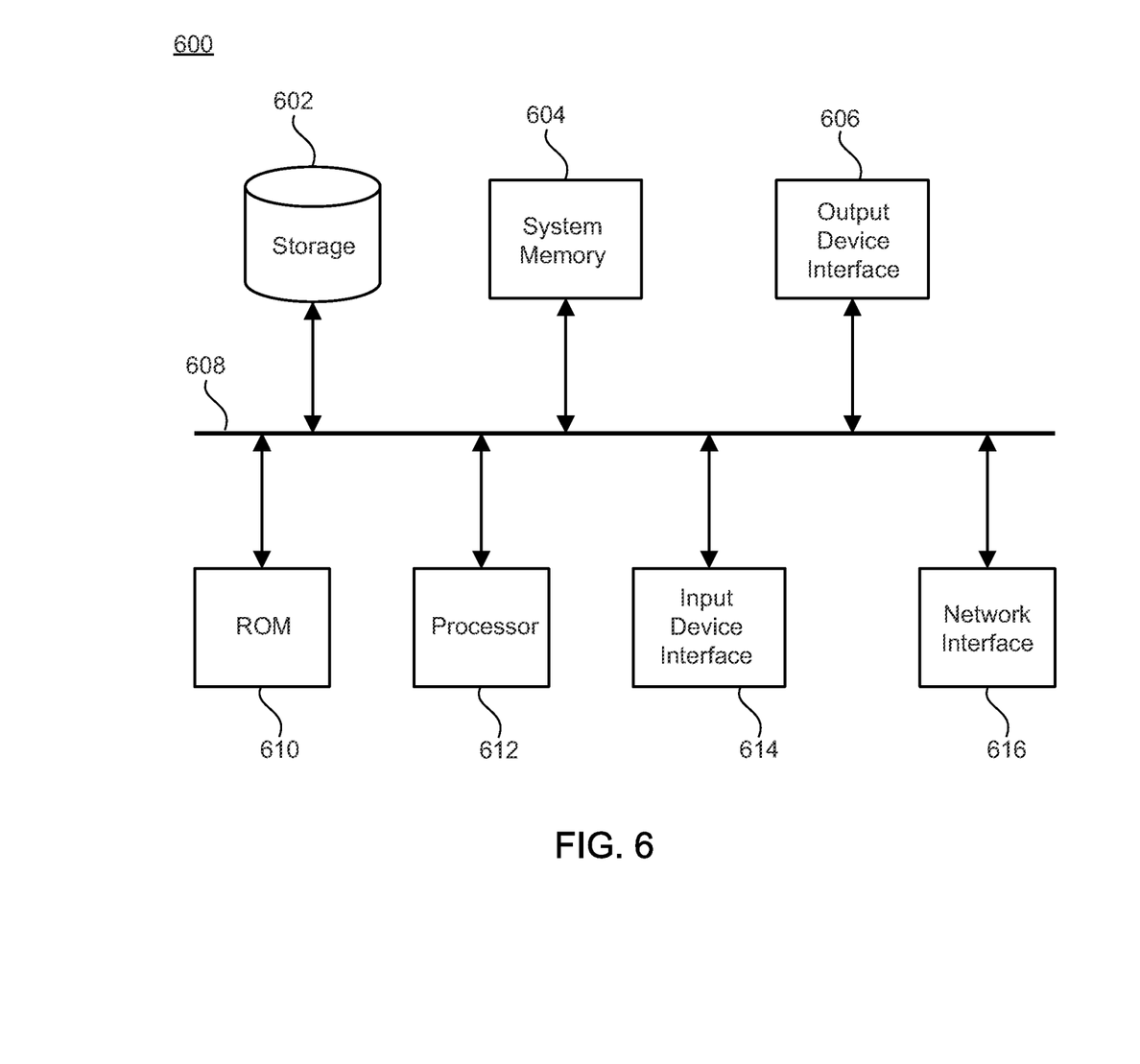
FIG. 6 conceptually illustrates an electronic system with which some implementations of the subject technology are implemented.

FIG. 6 conceptually illustrates an electronic system with which some implementations of the subject technology are implemented. Electronic system 600 can be a computer, phone, PDA, or any other sort of electronic device. Such an electronic system includes various types of computer readable media. and interfaces for various other types of computer readable media, Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data. to process in order to execute the processes of the subject disclosure. The processing unit(s) can be a single processor or a multi-core processor in different implementatons.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for processing images (e.g., satellite imagery) in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred. to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more," Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration," Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method of processing a satellite image of a region to determine a terrain boundary included therein, the method comprising:
    obtaining pixel data corresponding to the satellite image of the region;
    determining, for each pixel within a subset of the pixel data, multiple image features corresponding to texture and color statistics for the pixel and neighboring pixels of the pixel, based on a feature selection process for selecting discriminative features from the pixel data;
    generating an initial set of rules for determining a terrain boundary based on the obtained multiple image features;
    creating plural image models for applying to the pixel data based on the initial set of rules;
    applying the plural image models to the pixel data to generate at least one probability map, wherein the at least one probability map represents output of the plural image models and corresponds to different terrains within the satellite image; and
    generating a binary label mask for the satellite image based on the generated probability map, wherein the binary label mask indicates segmentations corresponding to the different terrains.

2. The method of claim 1, wherein the satellite image corresponds to a single satellite image or a blend of multiple satellite images.

3. The method of claim 1, wherein the terrain boundary corresponds to a boundary for a body of water.

4. The method of claim 1, wherein the determining comprises creating at least one histogram for each pixel within the subset of the pixel data.

5. The method of claim 4, wherein the at least one histogram corresponds to at least one of a color histogram, a texton histogram based on a Gabor filter response, or a texton histogram based on small image patches.

6. The method of claim 1, wherein the feature selection process corresponds to at least one of a linear discriminant analysis (LDA) with diagonal and with full covariance matrices or a boosting algorithm.

7. The method of claim 1, wherein the plural image models correspond to at least one of a model based on k-means clustering, a boosted decision stumps model, or a boosted linear classifier model.

8. The method of claim 7, wherein the model based on k-means clustering comprises a Gaussian mixture model with unit or with full covariance matrices.

9. The method of claim 1, further comprising:
    performing a smoothing process on the probability map to enforce consistency between neighboring pixels and overlapping images.

10. The method of claim 9, wherein the overlapping images are used to remove obstacles corresponding to at least one of cloud coverage or snow coverage.

11. The method of claim 1, wherein the obtaining, determining, generating the initial set of rules, creating, applying and generating the binary label mask steps are repeatedly performed using image data of higher resolution for the satellite image.

12. The method of claim 1, wherein one or more satellite images are divided into small tiles, and wherein the obtaining, determining, generating the initial set of rules, creating, applying and generating the binary label mask steps are performed in parallel on the small tiles on a cluster of computers.

13. A system for processing a satellite image of a region to determine a terrain boundary included therein, the system comprising:
   one or more processors; and
   a machine-readable medium comprising instructions stored therein, which when executed by the processors, cause the processors to perform operations comprising:
      obtaining pixel data corresponding to the satellite image of the region;
      determining, for each pixel within a subset of the pixel data, multiple image features corresponding to texture and color statistics for the pixel and neighboring pixels of the pixel, based on a feature selection process for selecting discriminative features from the pixel data, wherein the determining comprises creating at least one histogram for each pixel within the subset of the pixel data;
      generating an initial set of rules for determining a terrain boundary based on the obtained multiple image features;
      creating plural image models for applying to the pixel data based on the initial set of rules;
      applying the plural image models to the pixel data to generate at least one probability map, wherein the at least one probability map represents output of the plural image models and corresponds to different terrains within the satellite image; and
   generating a binary label mask for the satellite image based on the generated probability map, wherein the binary label mask indicates segmentations corresponding to the different terrains.

14. The system of claim 13, wherein the satellite image corresponds to a single satellite image or a blend of multiple satellite images.

15. The system of claim 13, wherein the terrain boundary corresponds to a boundary for a body of water.

16. The system of claim 13, wherein the at least one histogram corresponds to at least one of a color histogram, a texton histogram based on a Gabor filter response, or a texton histogram based on small image patches.

17. The system of claim 13, wherein the feature selection process corresponds to at least one of a linear discriminant analysis (LDA) with diagonal and with full covariance matrices or a boosting algorithm.

18. The system of claim 13, wherein the plural image models correspond to at least one of a model based on k-means clustering, a boosted decision stumps model, or a boosted linear classifier model.

19. The system of claim 18, wherein the model based on k-means clustering comprises a Gaussian mixture model with unit or with full covariance matrices.

20. The system of claim 13, the operations further comprising:
   performing a smoothing process on the probability map to enforce consistency between neighboring pixels and overlapping images.

21. The system of claim 20, wherein the overlapping images are used to remove obstacles corresponding to at least one of cloud coverage or snow coverage.

22. A non-transitory machine-readable medium comprising instructions stored therein, which when executed by a system, cause the system to perform operations comprising:
   obtaining pixel data corresponding to a satellite image of a region;
   determining, for each pixel within a subset of the pixel data, multiple image features corresponding to texture and color statistics for the pixel and neighboring pixels of the pixel, based on a feature selection process for selecting discriminative features from the pixel data;
   generating an initial set of rules for determining a terrain boundary based on the obtained multiple image features;
   creating plural image models for applying to the pixel data based on the initial set of rules;
   applying the plural image models to the pixel data to generate at least one probability map, wherein the at least one probability map represents output of the plural image models and corresponds to different terrains within the satellite image;
   performing a smoothing process on the probability map to enforce consistency between neighboring pixels and overlapping images, wherein the overlapping images are used to remove obstacles corresponding to at least one of cloud coverage or snow coverage; and
   generating a binary label mask for the satellite image based on the generated probability map, wherein the binary label mask indicates segmentations corresponding to the different terrains.

* * * * *